United States Patent [19]

Dean et al.

[11] 3,921,798

[45] Nov. 25, 1975

[54] CARTRIDGE LABEL HOLDER

[75] Inventors: Carl J. Dean, Charlton; Bernard T. Cournoyer, Holden, both of Mass.

[73] Assignee: Barry Wright Corporation, Watertown, Mass.

[22] Filed: May 6, 1974

[21] Appl. No.: 467,408

[52] U.S. Cl. .................. 206/53; 206/400; 206/459; 40/2 R; 40/10 R

[51] Int. Cl.² .................... B65D 85/67; B65D 85/02

[58] Field of Search ............. 206/398, 400, 53, 459; 40/2 R, 10 R, 21 C, 20

[56] References Cited

UNITED STATES PATENTS

| | | | |
|---|---|---|---|
| 1,279,607 | 9/1918 | Sublisky | 40/2 R |
| 1,808,895 | 6/1931 | Holtzman | 206/487 |
| 3,337,977 | 8/1967 | Sobesky | 40/10 R |
| 3,696,935 | 10/1972 | Dean | 206/400 |
| 3,785,482 | 1/1974 | Preston | 206/53 |
| 3,833,114 | 9/1974 | Osojnak | 206/53 |

*Primary Examiner*—William T. Dixson, Jr.
*Attorney, Agent, or Firm*—Milton E. Gilbert

[57] ABSTRACT

The invention consists of providing a label holder for association with a protective split-ring tape reel cover. The label holder comprises an elongate body that is shaped to lie flat against the outer peripheral surface of the tape reel cover and has a tab at each end for releasably interlocking it to the cover. The elongate body has a pair of longitudinally-extending side walls that are undercut to form grooves for receiving and retaining the edges of a label and a pair of end flanges that serve to retain the label card in place.

8 Claims, 7 Drawing Figures

CARTRIDGE LABEL HOLDER

This invention relates to tape cartridges and more particularly label holders for cartridges.

As is well known, much of the data that is processed by computers is recorded on magneticc tapes. For a variety of reasons, including the desire to facilitate cataloging, filing, processing and retrieval, masses of data are commonly subdivided and recorded on a plurality of tapes with each tape being wound on its own tape reel. A preferred mode of storing reels of data-bearing magnetic tape is to encase each reel in a protective cover assembly which consists of an expandable split ring member that is adapted to surround the outer circumference of the flanges of a tape reel and a toggle means secured to the ends of the split ring member for drawing such ends together to clamp the ring to the flanges. The toggle means also is adapted to expand the ring to unclamp it from the reel flange. The combination of protective cover assembly and reel of tape is frequently referred to as a tape cartridge. Such cartridges may be stored by stacking them horizontally or vertically in a cabinet or on open shelves. Frequently, the protective cofer assemblies are provided with hook-like projections whereby the cartridges may be stored by suspending them from a hangar bar. U.S. Pat. No. 3,620,478 issued 10/16/71 describes a protective cover assembly of the type just described.

A further type of split ring protective reel cover assembly comprises a toggle means which can be set to either of two open positions in which the ring member is expanded sufficiently either to permit rotation of the tape reel independently of the cover assembly or to permit removal of the cover assembly from the reel. The protective cover assembly also has an aperture that serves as a tape passage and movable door means adapted to be moved into open and closed postions with respect to the tape passage aperture by operation of the toggle means. This form of cartridge permits the tape to be unwound from and rewound on the reel while the reel is surrounded by the protective cover assembly, with pneumatic means being employed to transport the end of the tape through the tape passage aperture in the cover assembly. Protective reel cover assemblies embodying the foregoing features are disclosed in U.S. Pat. Nos. 3,371,882 and 3,620,478.

For obvious reasons, it is desirable that such tape cartridges be provided with means for identifying them. However, identification means heretofore employed have not been satisfactory. Thus, for example, adhesive coated stick-on labels may not adhere securely to the cartridge and may fall off during use or storage, with the possible result that the tape may have to be played out at least in part to identify its contents and permit application of a new label. On the other hand, an adhesive type label may be difficult to remove, particularly after the adhesive has aged for a time, with the result that changing the designation of a tape reel or cartridge may be time consuming. Furthermore, it is desirable for reasons of appearance and ease of cartridge selection that the identification labels be uniform in appearance and location. More specifically, where the cartridges are stored by suspending them from a hangar bar, it is desirable that the labels be applied to the peripheral outer surface of the cover assembly.

Accordingly, the object of this invention is to provide a new and improved mode of applying labels to the peripheral surface of a protective reel cover assembly.

A further object is to provide a label holder which is adapted for quick and easy attachment to and detachment from a tape cartridge.

Still another object is to provide a label holder which is simple and relatively inexpensive to manufacture, can make a reliable connection with a tape cartridge, and is adapted for quick and easy replacement of labels.

A further object is to provide means for affixing a label to a protective reel cover assembly in a position where it can be read easily and does not interfere with use or storage of the tape cartridge.

The foregoing and other objects hereinafter disclosed or rendered obvious are achieved by providing a label holder that comprises a flexible body which lies against the outer peripheral surface of a protective reel cover assembly, tab means adapted for insertion into slots in the reel cover assembly so as to lock the holder in place, and means for removably retaining a flat label card on the label holder. The label holder is adapted to flex so as to conform to the curvature of the cover assembly and so as to facilitate attachment and detachment thereof with respect to the cover assembly.

Other features and many of the attendant advantages of the invention are set forth or rendered obvious by the following detailed description of a preferred embodiment of the invention, wherein.

In the drawings, like numerals designate like parts.

Figures 1, 2, 3, 4, 5, 6, 7:
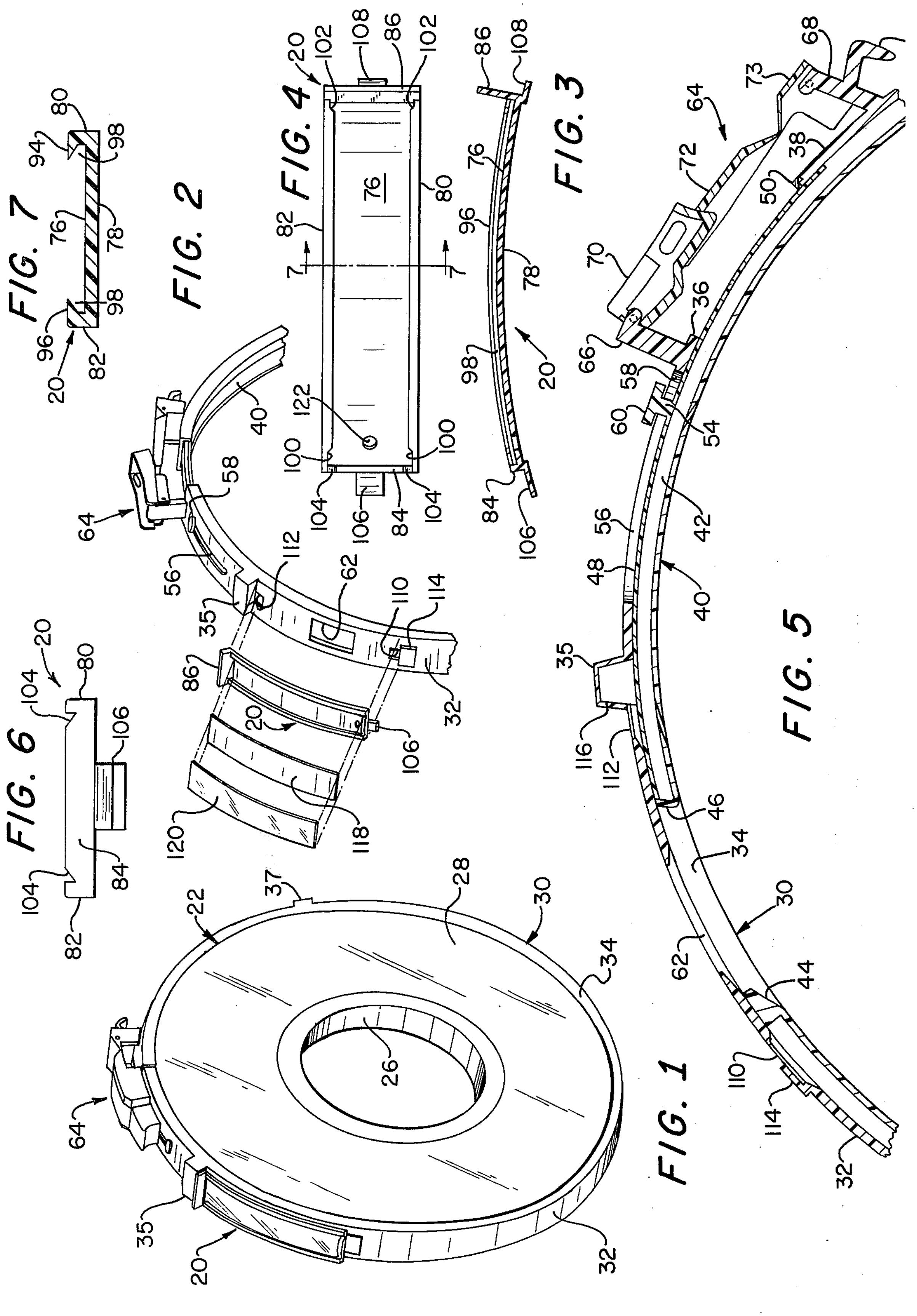
FIG. 1 is a perspective view of a tape cartridge with a label holder attached thereto in accordance with the present invention.
FIG. 2 is a fragmentary perspective view of the protective cover assembly detached from the tape reel, with the label holder shown in exploded relation thereto.
FIG. 3 is a longitudinal sectional view on an enlarged scale of the label holder.
FIG. 4 is a plan view of the label holder.
FIG. 5 is a fragmentary sectional view in side elevation and on an enlarged scale of the protective reel cover assembly per se in fully open position.
FIGS. 6 and 7 are end and cross-sectional views of the label holder.

Referring now to FIG. 1 there is shown a label holder 20 attached to a tape cartridge which comprises a reel 22 for carrying a spool of tape (not shown) and a protective reel cover assembly. Reel 22 includes a hub-receiving portion 26 and a pair of spaced circular side flanges, one of which is shown at 28. The reel cover assembly comprises a split ring 30 that consists of a band or main body section 32 with integral parallel flanges 34 at opposite sides thereof. The band 32 is provided with a pair of hollow abutments or ribs 34 and 37 which serve as guides for locating the tape cartridge when the latter is mounted on a machine. The ends of split ring 30 are identified by numerals 36 and 38 respectively. Disposed inside of ring 30 between its flanges 34 is a second curved band 40 which has a groove 42 formed on its outer side. Band 40 has end wall sections 44 and 46 closing off the ends of groove 42 and in addition a flat curved plate 48 is affixed to the band at the end which includes end wall section 46. Plate 48 extends over and conceals groove 42 for a suitable distance along the length of band 40 and is provided with a flange 50 that engages and forms a tongue and groove connection with the end 38 of ring 30. Commencing at about flange 50 and continuing for its full length up to end wall section 44, the band 40 is cemented to band 30. Thus the remaining portion of band 40, i.e., the portion between flange 50 and end wall section 46, is slidable relative to band 30. However, this remaining portion of band 40 is slidably interconnected with band 30, this being accomplished by a stud 54 that is affixed to band 40 and extends through a slot 56 formed in body section 32 of band 30. Slot 56 has an enlargement 58 at one end which is slightly oversized with respect to the head 60 of stud 54, whereby the stud may be detached from the band 40.

Band 30 is formed with a generally rectangular aperture 62 that is located closer to its end 36 than its end 38, with slot 56 disposed between the aperture and end 36. Aperture 62 functions as a tape access passage and is adapted to be closed off by the end of plate 48 when the ends of band 30 are brought together. Expansion and contraction of band 30 (and also band 40) is controlled by means of a toggle 64 (it also is sometimes referred to as a "toggle action hinge"). Toggle 64 comprises a first pivot post 66 formed integral with end 36 of band 30, a second pivot post 68 formed integral with band 30 adjacent its end 38, and a unitary hinge comprising a toggle lock arm 70, a first toggle lever 72, and second toggle lever 73. Arm 70 is pivotally connected at one end to post 66 and at the other end to one end of toggle lever 72. The other end of toggle lever 72 is hinged to toggle lever 73 which also is pivotally connected to pivot post 68. A hook 74 is formed integral with post 68 and serves as means for suspending the cartridge from a horizontal hangar rod when the cartridge is to be stored. A further more detailed description of toggle 64 is not believed to be necessary since such toggles are well know (see U.S. Pat. No. 3,620,478) and may be varied without departing from the principles of the present invention. Suffice it to state that toggle 64 is capable of assuming a closed position or either of two open positions, as described in said U.S. Pat. No. 3,620,478. When lock arm 70 is pivoted to the so called "machine open" position, band 30 is expanded by separation of its ends 36 and 38 an amount sufficient for the plate 48 of band 40 to be withdrawn far enough to expose aperture 62. Moving lock arm 70 to the "machine open" position frees the reel for rotation relative to the protective cover assembly. When lock arm 70 is placed in its closed position (FIG. 1), the ends 36 and 38 of band 30 are brought together and the slidable end of band 40 is shifted far enough along band 30 for its cover plate 48 to close off aperture 62. Also, when lock arm 70 is placed in its closed position, the band 30 is forced into clamping relation with reel 22. In the event that it is necessary or desirable either to remove or replace the tape reel without removal of the cover assembly and the machine is adapted to accommodate additional cartridge movement, the lock arm is placed in the "full open" position which is shown in FIGS. 2 and 5. This will cause the outer ring 30 to expand a sufficient extent to permit the reel to be released independently of the cover from the reel hub of a tape deck on which it is mounted. Another tape reely may be placed on the tape reel hub and the cover assembly returned either to the "machine open" position for continued operation or to the closed position.

Associated with the reel cover is the removable label holder 20. Referring now to FIGS. 2–4, 6 and 7, label holder 20 comprises an elongate body comprising a top surface 76, bottom surface 78, a pair of longitudinally extending sidewalls 80 and 82, and opposite end walls 84 and 86. The holder is formed of a flexible and resilient material such as a flexible plastic. The bottom surface is shaped so that the label holder will lie flat against the outer peripheral surface of band 32 of the tape cartridge cover assembly, as shown in FIG. 1 and described in detail hereinafter.

The side walls 80 and 82 of the label holder are undercut on their interior sides so as to define parallel rails 94 and 96 and grooves 98. Grooves 98 run for substantially the full length of walls 80 and 82; however, the rails are somewhat shorter in length than grooves 98, being cut back at their opposite ends as shown at 100 and 102. Additionally the end wall 84 is notched as shown at 104 to facilitate removing and inserting a label card as will be explained in detail hereinafter.

A pair of integral tabs 106 and 108 are formed as aligned extensions of the label holder. The tabs are offset so that their bottom surfaces are slightly below the bottom surface 78. Tabs 106 and 108 are adapted for insertion into key slots 110 and 112 respectively formed in band 32. Slot 112 is located at one of the two hollow locating abutments 35 on the band 32 and slot 110 is located at a hollow projection 114 formed integral with band 32. The abutment 35 and projection 114 from lips which are engaged by the tabs to retain the label holder to band 32.

Slots 110 and 112 are disposed one on each side of the tape exit aperture 62. It will be appreciated that the dimensions of tabs 106 and 108 are such that the tabs can project sufficiently under the surface 116 of abutment 35 and projection 114 to retain the label holder to band 32 when the tabs are inserted into slots 110 and 112. The overall distance between the near end of projection 114 and surface 116 of abutment 35 exceeds the length of the tab holder body by an amount that allows the label holder when so attached to assume substantially its unflexed state yet be restrained against lengthwise movement relative to the band 32.

The label holder is designed to hold a label card 118 and, if desired, a protective cover 120 for the label card formed of a flexible, transparent material such as an acetate film. Label card 118 and cover 120 are dimensioned so as to fit and slide in grooves 98. The label card and cover are retained in the place in the holder by rails 94 and 96 and end walls 84 and 86.

Finally, a small hole 122 is provided through the body of the label holder adjacent to end wall 84. Hole 122 provides access for one to push a pointed object such as a pencil point to deflect the label card 118 and cover 120 at its end so as to facilitate removal of the label card and cover as will become clear from the description following.

A description of the use of the label holder thus described will be useful in delineating the inventive concepts involved. The label holder is held in one hand, e.g. the left hand, at side walls 80 and 82, and the label card and transparent card cover are held in the other hand. The label card and cover are positioned adjacent end wall 84, are squeezed so as to be bowed in cross section, and while so bowed, are inserted into grooves 98 via notches 104. The card and card cover are slid into the holder until the leading edges of the card and cover engage the vertical surface of end wall 86.

The label holder is attached to a tape cartridge as follows. The label holder 20 is inclined relative to the outer peripheral surface of band 32, and tab 106 is slid into slot 110. The label holder is then flexed enough to permit tab 108 to be inserted into slot 112. The label holder is now secured to the tape cartridge. It will be appreciated that the label holder also covers the exit aperture 62.

To remove the label holder from the cartridge, the user grasps the label holder at side walls 80 and 82 and pulls the holder upward from the cartridge. This flexes the holder body and whereby tab 108 may be readily withdrawn from slot 112. The label holder may then be removed simply by withdrawing tab 106 from slot 110. One skilled in the art will recognize another advantage of the invention. End wall 86 projects radially far enough to prevent accidental insertion of the tape cartridge in a machine while the label holder is still on the cartridge. Also, end wall 86 provides a means for hooking onto the label holder so that the latter may be retained on the machine e.g. as by a clip, when its associated tape cartridge is in use.

Another advantage of the instant invention is evident when one desires to remove and/or replace the label card. To remove the label card, the holder 20 is removed from its associated tape cartridge as above described. Then one simply inserts a small pointed object such as a pencil point through hole 122. The pencil point deflects the ends of the label card 118 and cover 120 so that the user may grip the deflected ends whereby the label card and cover may be readily slid out of grooves 98.

The present invention has numerous other advantages. The lable holder may be molded of various plastics by conventional molding techniques at relatively low cost. The use of plastic permits adequate control of flexibility and resiliency. More important, the label holder may be easily installed and removed from a cartridge. In this connection, it is noted that the tabs and slots assure proper positioning of the label holder so that the latter will also act as a cover to the exit aperture in the cartridge. A particular advantage is that the label material is held on the tape cartridge purely by physical retaining means, and this eliminates entirely the requirement and disadvantages of using adhesive materials.

Since certain obvious changes may be made in the illustrated embodiment of the device without departing from the scope of the invention, it is intended that all matter contained herein be interpreted as illustrated and not in a limiting sense.

What is claimed is:

1. The combination of a protective reel cover assembly and a label card holder, said reel cover assembly comprising a resilient split ring band for encasing the periphery of a tape reel and toggle means connected to the ends of said split ring band for selectively expanding or contracting said band so as to selectively place said band in non-clamping or clamping relation to a tape reel, said band also having a pair of spaced slots and a tape access aperture located between said slots, said label card holder comprising an elongate body and a pair of retaining tabs located at opposite ends of said body, said elongate body extending over and concealing said tape access aperture and said tabs extending into said slots and interacting with said band to retain said label holder on said band, said elongate body comprising a top surface facing away from said band for supporting a label card and side walls at opposite sides of said top surface having grooves for slidably receiving and interlocking with the edges of the label card.

2. The combination of claim 1 wherein at least a portion of said label holder is flexible and resilient so as to permit removal of said tabs from said slots by flexing of said label holder.

3. The combination of claim 1 wherein said grooves are defined by a pair of rails extending along the inside of said opposite side walls for a distance shorter than the length of said walls.

4. The combination of claim 3 wherein said rails are tapered in cross-section.

5. The combination of claim 1 wherein said elongate body also comprises a pair of opposite end walls, with one of said end walls being notched adjacent said side walls to facilitate insertion of a label card into said grooves.

6. The combination of claim 1 wherein said elongate body has a curved bottom surface facing said band and said tabs are offset from said bottom surface.

7. A label card holder for attachment to a tape reel cover assembly having a circular outer peripheral surface, said label card holder comprising an elongate body having an upper surface and a lower surface with said lower surface being curved to lie flat against said outer peripheral surface, a pair of tabs at opposite ends of said body, said tabs being offset from said lower surface, a pair of side walls integral with and extending longitudinally of said body at opposite sides of said top surface, said side walls having grooves for slidably receiving and interlocking with the edges of a label card, and means at opposite ends of said body for limiting movement of said lable card lengthwise of said body, at least a portion of said label card holder being flexible and resilient so as to permit said tabs to be attached to said tape reel cover assembly by a snap fit.

8. A label card holder for attachment to a tape reel cover assembly having a circular outer peripheral surface, said label card holder comprising an elongate body having an upper surface and a lower surface with said lower surface curved to lie flat against said outer peripheral surface, a pair of side walls at opposite sides of said top surface, means cooperating with said side walls for holding a label card flat against said upper surface, means for limiting movement of a label card lengthwise of said body, and means at opposite ends of said body for releasably securing said label card holder to said tape reel cover assembly, at least a portion of said label card holder being flexible and resilient so as to permit said last-mentioned means to interlock with said tape reel cover assembly by a snap fit.

* * * * *

UNITED STATES PATENT AND TRADEMARK OFFICE

CERTIFICATE OF CORRECTION

PATENT NO. : 3,921,798

DATED : November 25, 1975

INVENTOR(S) : Carl J. Dean and Bernard T. Cournoyer

It is certified that error appears in the above-identified patent and that said Letters Patent are hereby corrected as shown below:

Column 1, Line 26: Delete "cofer" and substitute therefor the word "cover"

Column 1, Line 28: Delete "hangar" and substitute therefor the word "hanger"

Column 1, Line 66: Delete "hangar" and substitute therefor the word "hanger"

Column 3, Line 33: Delete "hangar" and substitute therefor the word "hanger"

Column 3, Line 36: Delete "know" and substitute therefor the word "known"

Column 3, Line 63: Delete "reely" and substitute therefor the word "reel"

Column 4, Line 28: Delete "from" and substitute therefor the word "form"

Column 6, Line 40: Delete "lable" and substitute therefor the word "label"

Signed and Sealed this

*first* Day of *June 1976*

[SEAL]

*Attest:*

RUTH C. MASON
*Attesting Officer*

C. MARSHALL DANN
*Commissioner of Patents and Trademarks*